J. D. WILLIAMSON, Jr.
GEARING.
APPLICATION FILED JULY 20, 1911.

1,033,752.

Patented July 23, 1912.

3 SHEETS—SHEET 3.

Witnesses—
William T. Nase
Willets Burrowes

Inventor—
John D. Williamson Jr.
by his Attorneys:—
Howson & Howson

UNITED STATES PATENT OFFICE.

JOHN D. WILLIAMSON, JR., OF PHILADELPHIA, PENNSYLVANIA, ASSIGNOR TO AMERICAN ENGINEERING COMPANY, A CORPORATION OF PENNSYLVANIA.

GEARING.

1,033,752.  Specification of Letters Patent.  Patented July 23, 1912.

Application filed July 20, 1911. Serial No. 639,629.

*To all whom it may concern:*

Be it known that I, JOHN D. WILLIAMSON, Jr., a citizen of the United States, residing in Philadelphia, Pennsylvania, have invented certain Improvements in Gearing, of which the following is a specification.

One object of my invention is to provide a novel combination of apparatus, which shall primarily be relatively simple and substantial, whereby it shall be possible to drive a hoisting drum or winch head in either of two directions at will; the particular form of apparatus illustrated being designed for operating the bull wheel of a derrick.

I further desire to provide apparatus of the general type above noted, which while being compact, shall have its parts so arranged that they will not be liable to get out of order or require undue attention.

These objects and other advantageous ends I attain in the following manner, reference being had to the accompanying drawings, in which:—

Figure 1:
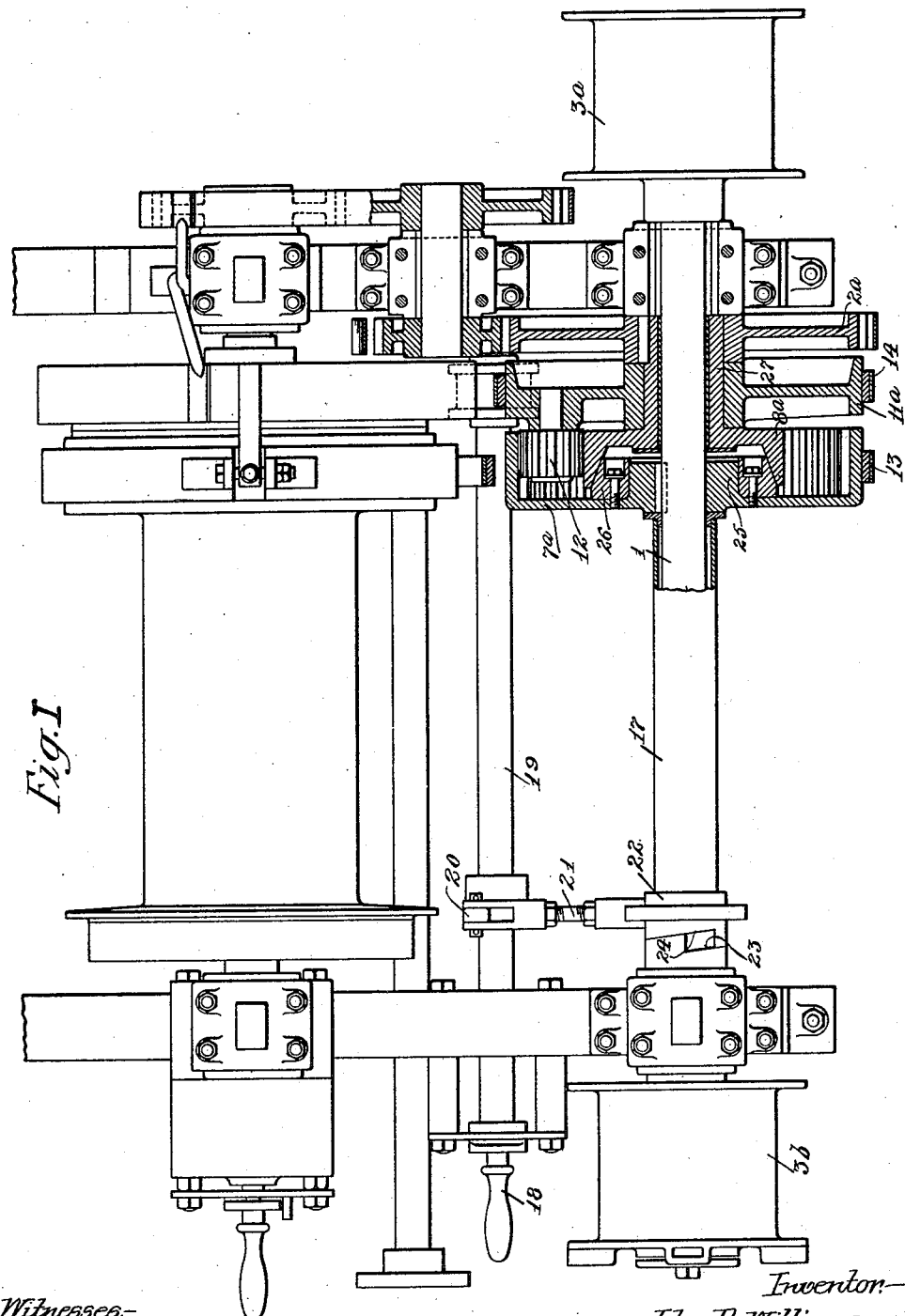
Figure 2:
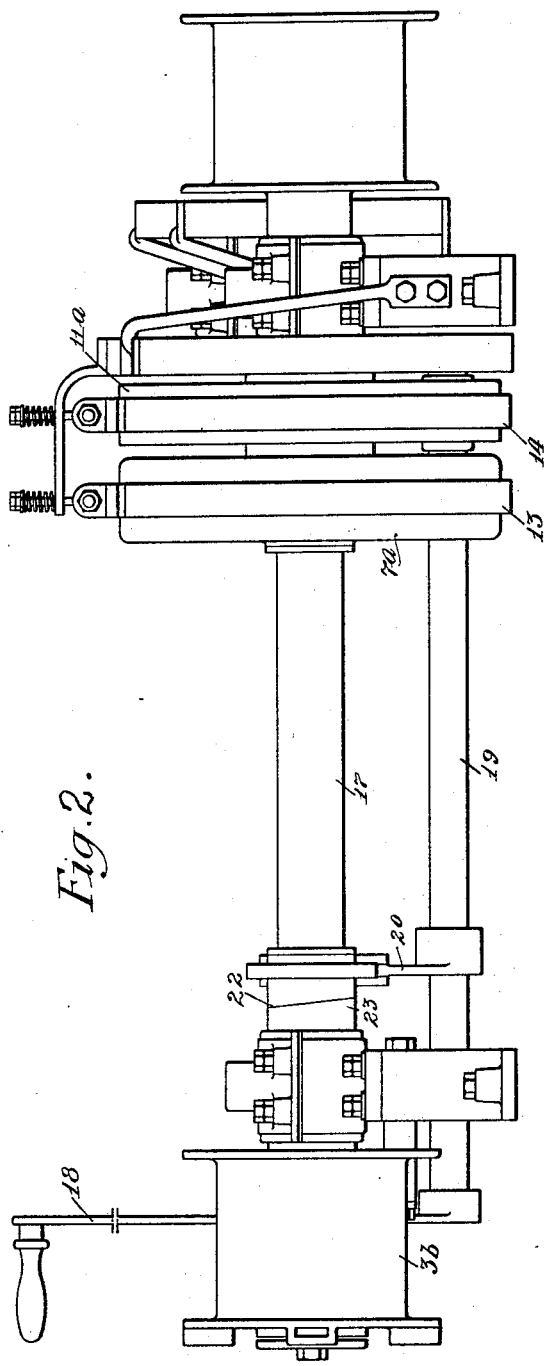
Figure 3:
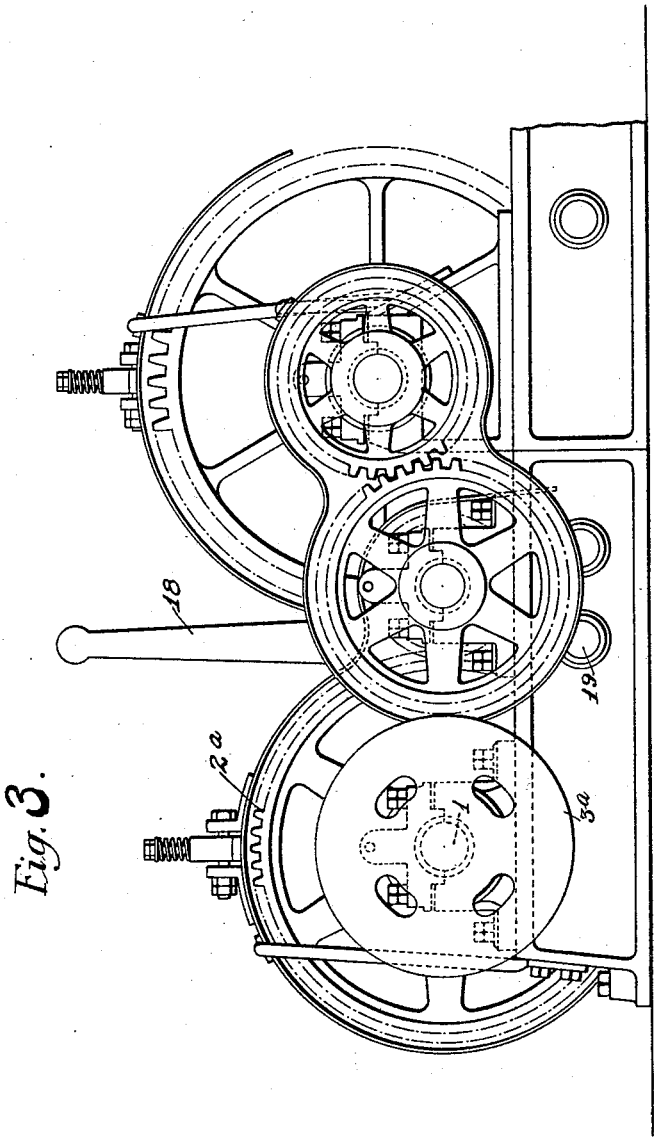

Figure 1 is a plan view of a hoisting machine illustrating, in horizontal section, one form of my invention, and Figs. 2 and 3, are respectively end and side elevations, further illustrating the machine shown in Fig. 1.

In the above drawings, I have illustrated a pair of winch heads, or overhanging drums $3^a$ and $3^b$, mounted on opposite ends of a shaft 1. In this instance, there is provided a sleeve 17 which, by means of an operating handle 18, shaft 19, arm 20, link 21 and collar 22, may be caused to move longitudinally of said shaft 1 owing to the co-action of two beveled faces 23 and 24 respectively on a sleeve fixed to one of the bearings for the shaft 1 and on the end of the collar 22. Said shaft has keyed to it an internally toothed gear $7^a$ provided with a hub 25 carrying an annular series of friction blocks 26 or other structures, to form one member of a clutch whose second member is a spur gear $8^a$ having a conical recess designed to coöperate with the conical surfaces of said blocks. A structure $11^a$ is loosely and concentrically mounted on a prolongation 27 of the hub of the gear $8^a$, which has keyed to it the gear $2^a$, and which has the shaft 1 passing through it. Brake bands 13 and 14 are provided whereby the internally toothed gear $7^a$, or the structure $11^a$, may be held from turning as desired. With this arrangement of parts, the hub 27 and hence the spur gear $8^a$ are driven when desired from the gear $2^a$, and if the handle 18 be properly operated, the clutch member 26 may be made to grip the member $8^a$ so that the shaft 1 and hence the winch heads $3^a$ and $3^b$ are turned in the same direction as said gear $2^a$. If the brake band 14 be applied, the structure $11^a$ is held from turning and the power is transmitted from the spur gear $8^a$ through the pinion 12, which meshes with the internal gear $7^a$ and with the said spur gear, so that the shaft 1 is turned in a direction the reverse of that previously noted.

I claim;—

1. The combination in hoisting mechanism of a driving member; a gear fixed thereto and having an extended hub; a member mounted on said hub so as to be freely revoluble independently of the same; a pinion carried by said member; a shaft concentric with the gear; an internally toothed gear fixed to the shaft and meshing with said pinion; means for frictionally connecting said first gear and the internally toothed gear at will; with means for holding said freely revoluble member from turning.

2. The combination in a hoisting machine of a shaft; a sleeve mounted on the shaft; an internally toothed gear fixed to the shaft; a spur gear loosely mounted on the shaft; a driving member for turning said spur gear; a friction clutch having one member mounted on the spur gear and the other on the internally toothed gear; a freely revoluble member; a pinion thereon meshing both with the spur gear and with the internally toothed gear; means for longitudinally moving said sleeve to actuate the friction clutch; and means for holding the freely revoluble member at will to keep it from turning.

In testimony whereof, I have signed my name to this specification, in the presence of two subscribing witnesses.

JOHN D. WILLIAMSON, JR.

Witnesses:
WILLIAM E. BRADLEY,
JOS. H. KLEIN.

Copies of this patent may be obtained for five cents each, by addressing the "Commissioner of Patents, Washington, D. C."